INVENTOR.
JOSEPH W. GRATIAN
RICHARD W. FREYTAG
FRED GUNTERLEITNER
BY Raymond L. Owens
ATTORNEY Jan. 2, 1968 J. W. GRATIAN ET AL 3,362,019

FERROELECTRIC MEMORY

Filed July 15, 1966 2 Sheets-Sheet 2

INVENTOR.
JOSEPH W. GRATIAN
RICHARD W. FREYTAG
FRED C. UNTERLEITNER
BY Raymond L. Owens
ATTORNEY United States Patent Office 3,362,019

Patented Jan. 2, 1968

3,362,019
FERROELECTRIC MEMORY

Joseph W. Gratian, Richard W. Freytag, and Fred C. Unterleitner, Rochester, N.Y., assignors to General Dynamics Corporation, a corporation of Delaware Filed July 15, 1966, Ser. No. 565,520
9 Claims. (Cl. 340—173.2)

This invention relates to a novel method for effectively employing ferroelectric memory storage devices.

Ferroelectric information storage devices are especially suitable for use in random access computer input-output memory systems, and they are also applicable for use with other data storage arrangements. Ferroelectric materials have the advantageous properties of being relatively immune from radiation and magnetic flux and are capable of virtual nondestructive readout by means of stress pulses.

Existing ferroelectric devices employ propagating stress pulses which, when applied coincidently with an electric field, alter the polarization characteristics of an incremental region of the medium of ferroelectric material. Heretofore, ferroelectric storage devices employing a coincidently-applied mechanical stress pulse and an electric field have utilized 90° domain switching or reorientation for data storage rather than substantially full reversal of polarization or 180° switching. Ninety degree switching has an inherent drawback in that the switching requires a stress pulse of relatively long duration. Consequently, ferroelectric devices employing 90° switching are limited in ability to rapidly store data.

Heretofore, it has been assumed that 180° switching is not substantially affected or influenced by propagating stress pulses, inasmuch as mechanical stresses in and of themselves cannot cause 180° switching. However, quite unexpectedly, it has been found that when a relatively short tensile pulse is applied in coincidence with an electric field, it enhances 180° switching, and conversely, a short compressive pulse applied in coincidence with an electric field inhibits 180° switching.

It is an important feature of the present invention that by employing 180° switching, the rate that data may be stored in a ferroelectric device has been greatly increased over what has previously been thought possible.

It is a further advantage of the invention to improve read-out performance, inasmuch as the output signal magnitude from an address which is switched 180° is larger than that obtained from an address only 90° switched.

Figure 1:
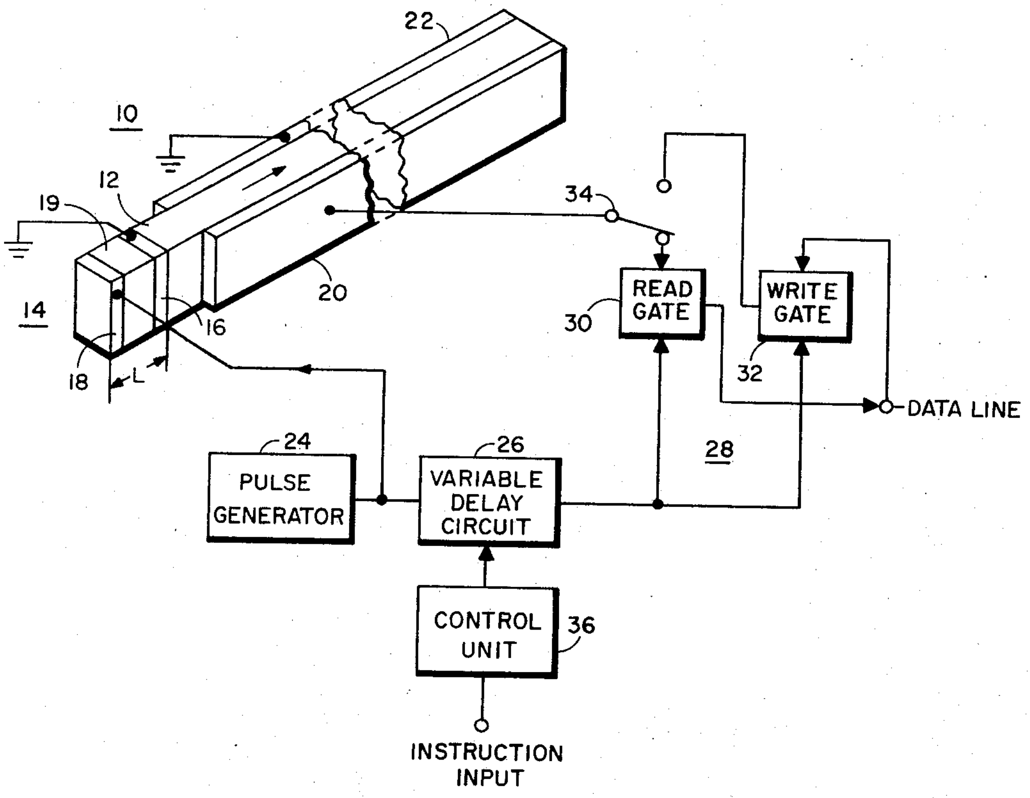
Figure 4:
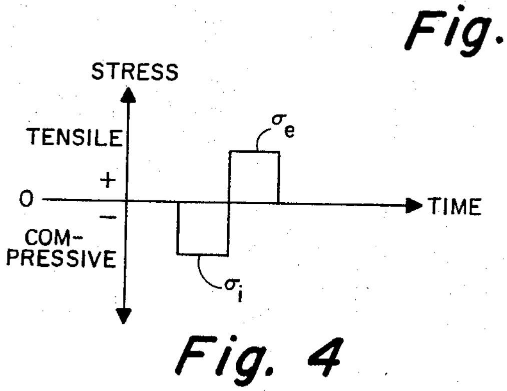

The invention itself, both as to its organization and method of operation, as well as additional features and advantages thereof will become more readily apparent from a reading of the following description taken in conjunction with the accompanying drawings in which:

FIG. 1 is a diagrammatic representation of a memory device which may be employed in accordance with the present invention, the representation including block diagrams of the circuit of the device;

FIGS. 2A and 2B, and 3A and 3B are curves illustrating the polarization or hysteresis characteristics of the device shown in FIG. 1 when it is utilized in accordance with the invention; and FIG. 4 shows an illustration of a bi-polar stress pulse having tensile and compressive components which may be formed by the device shown in FIG. 1.

Referring more particularly to FIG. 1, there is shown a memory device 10 including an elongated rectangular bar 12 which is comprised of a ferroelectric material, such as for example, barium titanate, lead-zirconate titanate, lead titanate, or the like. By way of general comment, the term ferroelectric material will be understood to include those materials which exhibit a hysteresis loop effect when subject to an electric field. From the above-indicated group, it has been found preferable to have the rod 12 comprised of lead-zirconate titanate.

A transducer 14 is provided at one remote end of the rod 12 and includes a pair of conductive electrodes 16 and 18, the electrode 16 being bonded to the rod 12. Between the electrodes 16 and 18 is sandwiched a part 19 which may be comprised of lead-zirconate titanate. More particularly, the transducer 14 is one which is excited or actuated by an electric signal and piezoelectrically develops a uni-polar pulse which is either substantially tensile or compressive in nature, or a bi-polar mechanical stress pulse, such as shown in FIG. 4. Preferably, an acoustic termination, for example, a strip of vibration absorbing neoprene rubber material may be located adjacent to each of the ends of the rod 12 for absorbing and preventing the reflection of propagating mechanical stress pulses. In order to simplify the illustration, these acoustic terminations have not been shown in FIG. 1.

Inasmuch as a stress pulse generated by the transducer 14 will travel through the rod 12 at the speed of sound, it may be thought of as a sonic wave which propagates along an acoustic or sonic transmission line provided by the rod 12. Moreover, the longitudinal stress pulse generated by the transducer 14 propagates in the direction of the arrow shown in FIG. 1, and it has been found preferable to have the amplitude of the components of the stress pulse, whether the pulse is uni-polar or bi-polar, run substantially parallel to the direction of stress pulse propagation.

Reference may be made to the description of the operation of the transducer 14, set forth in U.S. patent application Ser. No. 406,266, entitled, "Information Handling," which is owned by the assignee of the present invention, for further explanation of the operation of a transducer, which may be used in the present invention.

In the present invention, in order to develop a bi-polar pulse, the piezoelectric part 19 expands in response to the leading edge of a positive square wave voltage pulse developed by a pulse generator 24 to generate a compressive component and contracts in response to the lagging edge of the voltage pulse to develop a tensile component. Also, the intensity of the tensile and compressive components of the bi-polar pulse is a function of the amplitude of the square wave voltage pulse.

The duration of each half of the bi-polar pulse is equal to the length of the transducer divided by the velocity of sound in the piezoelectric material. Consequently, by properly selecting the length of the transducer (dimension L shown in FIG. 1) any desired stress pulse duration may be obtained. Accordingly, the length of the transducer 14 determines the timing between when the leading tensile pulse terminates and the lagging compressive pulse begins. As shown in FIG. 4, which is a specific case, the duration of the voltage pulse is selected so that the compressive pulse is generated immediately upon termination of the leading tensile pulse.

A uni-polar stress pulse may be formed by having the generator 2A apply a sawtooth type pulse to the transducer, wherein the leading edge of the sawtooth is substantially vertical, and the trailing edge has a relatively gentle slope. If the sawtooth pulse and polarization are both positive, the stress pulse in the line will be compressive, whereas if the voltage pulse and polarization are opposite, the stress pulse will be tensile in nature.

Another pair of conductive electrodes 20 and 22 are arranged on opposite side faces of the rod 12 for establishing an electric field across a substantial portion of the length of the rod 12, the field being transverse (perpendicular in the illustrated case) to the direction of propagation of the stress pulse. The conductive electrodes 20 and 22 being parallelly disposed are positioned to cause 180° domain switching within the rod 12 when a field of sufficient intensity is established within the rod 12. Only a single connection to the electrode 20 is needed to provide access to all of the addresses of the data to which storage is to be provided in the rod 12. The other electrode 22 is shown to be grounded.

The circuitry associated with the device 10 includes the pulse generator 24 which provides either square wave or sawtooth wave pulses at appropriate intervals. The output pulses from the generator 24 excite the electromechanical transducer 14 and a mechanical pulse is propagated along the rod 12 for each output pulse which is generated. The pulses are applied to a variable delay circuit 26, which may be of various types known in the art such as a phantastron or a monostable multivibrator which provides an output pulse, the leading or lagging edge of which may be shifted in time.

The output pulse from the generator 24, after a delay in the circuit 26, is applied to the read-write logic 28 which includes a read gate 30 and a write gate 32. The logic 28 also includes a switch 34 which connects one of the conductive electrodes 20 to an input of the read gate 30 or to an output of the write gate 32. The read and write gates may be AND gates.

A control unit 36, operated by the instruction portion of the data, is connected to the variable delay circuit 26 for adjusting delay provided by the circuit in correspondence with an address for the data in the device 10. For example, the control unit 36 may be a digital-to-analog converter which converts the instruction code representing the address to a voltage which varies the delay in the delay circuit 26. This delay may correspond to the time of propagation of the mechanical pulse to a point on the rod 12 corresponding to the address of the data. The read gate 30 or the write gate 32 are then enabled so that the data line may be connected to the conductive electrode 20. When the switch 34 is in the read position, the data line is connected through the write gate to the conductive electrode 20 so that the signals representing the data may be stored at the proper address in the rod 12. It should be understood that by address is meant that increment along the rod 12 which provides storage for a particular item of data. This data may be a binary "1" bit or a binary "0" bit which respectively may be represented by opposite senses of polarization of the increment or by the absence and presence of polarization of the increment.

In an alternative mode of operation, a train of mechanical pulses may be propagated along the rod 12 during the propagation time for the rod 12. The absence and presence of a mechanical pulse at different locations in the pulse train can respectively represent data bits of opposite value. A voltage pulse applied to the electrode 20 coincident with the termination of the mechanical pulse train will effect the polarization of successive increments along the rod in accordance with the data represented by the pulse train. The data bits stored in the rod may be read out sequentially at the electrode 20, when a single mechanical pulse is again propagated along the rod 12.

In accordance with the present invention, it has been determined that if a compressive stress pulse is made to be sufficiently short in duration and applied in coincidence with an electric field of sufficient intensity, this combination will inhibit 180° domain switching; conversely, the simultaneous application of a tensile pulse and an electric field will greatly enhance 180° switching if the tensile pulse duration is of a relatively short time span. Intermediate between the predominance of either 180° or 90° switching, it has been found that ferroelectric materials can not be effectively polarized due to the fact that the effects of 180° switching and 90° switching tend to cancel each other. It therefore follows that the stress pulse duration is of critical significance, inasmuch as if the pulse duration is relatively long, 90° switching will predominate, and if it is relatively short, 180° switching will predominate. This fact teaches how to obtain 180° switching to the exclusion of 90° switching.

Figure 2A:
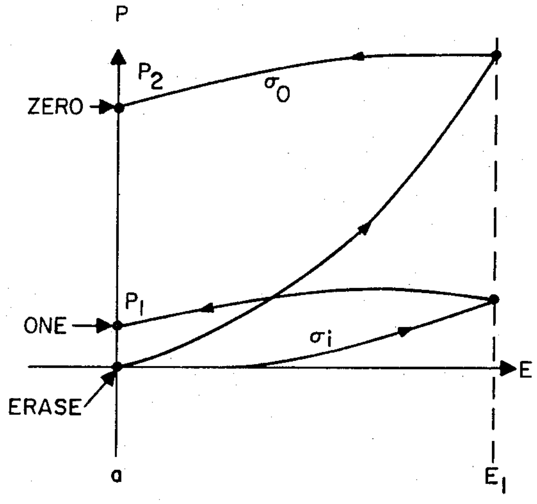

FIG. 2A depicts the inhibiting mode of operation of the ferroelectric rod 12 of the device 10 with short uni-polar compressive pulses. At any predetermined address, when the output of the delay circuit 26 and the data line are connected through the write gate 32 to the control electrodes 20 and 22, a transverse field having an intensity indicated as $E_1$ is established between the electrodes 20 and 22. Just prior to this time, a propagating uni-polar compressive pulse will have arrived at the predetermined address and the compressive pulse $\sigma_i$ in combination with the field $E_1$ will effectively prevent any substantial change in the polarization of the rod 12 at the predetermined address. On the other hand, the field $E_1$ will be of sufficient intensity to substantially increase the 180° polarization of the other increments $\sigma_0$ of the rod 12, due to the fact that the field $E_1$ alone will have to be chosen to be sufficient to substantially increase the 180° polarization of the rod 12. When the field intensity $E_1$ is removed, negligible residual polarization $P_1$ remains at the predetermined address and may be assigned to represent the binary "1" bit. The polarization $P_2$ of the remainder of the rod 12, where the field $E_1$ was applied alone, will be at a substantially greater positive value, say $P_2$, which may be made to represent the binary "0" bit.

It has been found most preferably in the inhibiting mode to apply and then remove the electric field $E_1$ sometime within the period of duration of the compressive pulse (viz. that interval of time that it takes the compressive pulse to pass by the predetermined address).

Figure 2B:
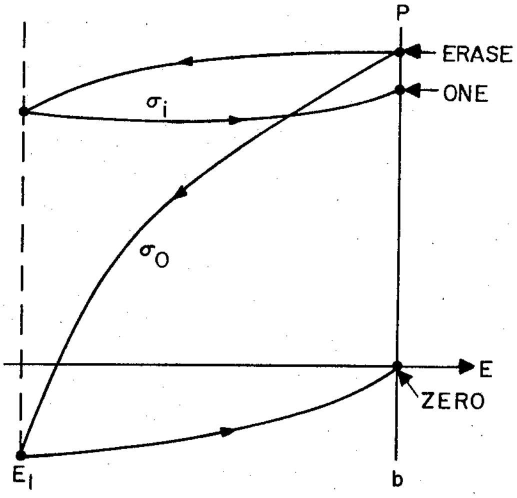

The inhibiting mode will also be applicable, as shown in FIG. 2B, when it is desired to have a higher polarity level represent the binary "1" bit and a lower polarity level represent the binary "0" bit. Thus, in this instance, the entire rod 12 may initially be positively pre-polarized to an erase level by means of applying a field between the electrodes 20 and 22. Thereafter, the simultaneous application of the field $E_1$ and the compressive pulse $\sigma_i$ will prevent any substantial decrease from this polarization level and may be assigned to represent the binary "1" bit, whereas the application of the field $E_1$ alone may be used to reduce the polarization of the rod 12 and assigned to represent the binary "0" bit.

In order to return the line to the erase polarity level, which is preferably at a saturation level, a voltage is applied between the electrodes 20 and 22 causing 180° switching which will be sufficient to return the rod 12 to the erase polarity level. This eliminates the need for applying a large number of alternating voltages of different intensities between the electrodes 20 and 22, as used in the prior art, to obtain a particular erase polarization level.

Figure 3A:
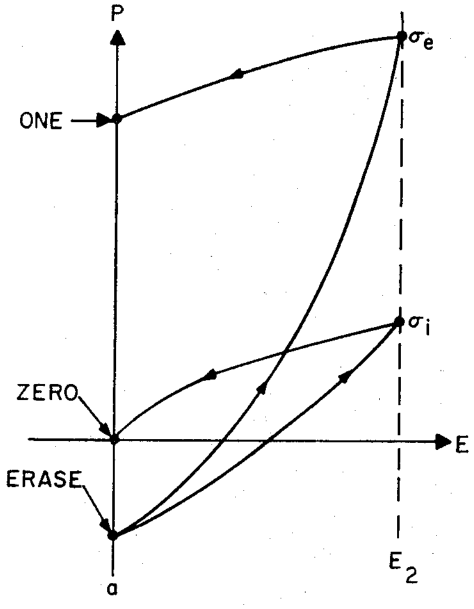

FIG. 3A shows an application of the present invention using the bi-polar pulse of FIG. 4 in an enhancing mode of operation. In this example, the simultaneous application of a field having an intensity $E_2$ which for any given rod 12 will be somewhat smaller than the field $E_1$ used in the inhibiting mode illustrated in FIG. 2A, and the tensile portion of the stress pulse $\sigma_e$ at a predetermined address causes a substantial increase in the polarization of the rod 12 at that address which may be used to represent the binary "1" bit, whereas the application of the field $E_2$ coincidently applied with the compressive pulse component $\sigma_i$ or applied alone in the rod 12 will not increase the polarization of the rod 12 much beyond its initial erase polarization level and may be assigned the value of the binary "0" bit.

The enhancing mode shown in FIG. 3A, as compared with FIG. 2A, employs a different operating point on the hysteresis curve of a given ferroelectric material comprising the rod 12 so that the field $E_2$ applied alone will not substantially change any initial polarization level of the rod; while on the other hand, the field $E_1$ when applied alone in the inhibit mode of FIG. 2A will have a substantial effect upon any initial polarization level of the rod 12. It will be noted that the erase polarization level, shown in FIG. 3A, has a negative polarization somewhat lower than a zero level. This has been found to be the preferable starting position which reduces readout noise levels because it keeps the binary "0" bit as close as possible to a zero polarization level.

Figure 3B:
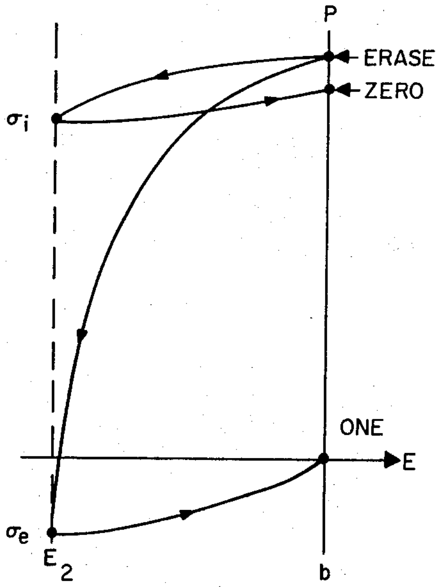

FIG. 3B is similar to FIG. 3A, in that it illustrates the use of bi-polar pulses, except that the ferroelectric material has been pre-polarized to have a substantial polarization. In this instance, the simultaneous application of a tensile pulse component $\sigma_e$ and an electric field of an intensity $E_2$ will cause a significant reduction in the polarization of the rod 12 which may be assigned the value of the binary "1" bit, whereas the application of the field $E_2$ alone or in combination with a compressive pulse component $\sigma_1$ will not substantially change the initial polarization level and may be assigned the binary "0" bit.

It will also be understood that the enhancing mode of operation illustrated by FIG. 3B will also be applicable if the entire rod 12 is pre-polarized in a negative condition to some predetermined erase level. Therefore, in this example, a selected increment may be polarized positively by the simultaneous application of a tensile stress $\sigma_e$ pulse and the electric field $E_2$ to store a binary bit.

A specific example illustrating the operation shown in FIG. 2A will now be set forth. It has been found that when the rod 12 is comprised of lead-zirconate titanate, a uni-polar compressive stress pulse of about 6,300 p.s.i. and having a duration of no greater than about 5 microseconds when applied in combination with a field $E_1$ of about 40 kv./cm. for about 2 microseconds is very effective for data storage. With this example, a discernible readout of the stored data on the rod 12 may be accomplished by propagation of a uni-polar pulse of 5 microseconds duration having an amplitude of about 1,500 p.s.i.

For any sample of a specific ferroelectric material, the polarization (viz. switching) characteristic will vary, but this does not present a major problem, inasmuch as by simply varying the various parameters, such as stress pulse and field intensity, determinations may be readily made as to the operating conditions at which 180° switching will substantially predominate. Moreover, the condition may be visually checked by means of observing domain walls of the film surface under polarized light by means of an electron microscope, when establishing the parameters for different ferroelectric materials.

While specific applications of the invention have been described and shown, it should be considered only to be illustrative as still further modifications will undoubtedly occur to those skilled in the art. Therefore, the foregoing descriptions are to be considered as illustrative and not in any limiting sense.

What is claimed is:

1. A method of employing a ferroelectric memory device having a body comprised of ferroelectric material capable of being permanently polarized by means of 180° domain switching, means for propagating a stress pulse through said body, two spaced electrodes disposed adjacent to said body for establishing an electric field therein when energized, and means responsive to data to be stored for coincidently establishing said stress pulse and electric field at selected increments, which method comprises (a) propagating a stress pulse through said body transverse to the direction of said electric field, and (b) selectively establishing in an increment of said body an electric field coincidently with said stress pulse the coincident application of said field and stress pulse being of sufficient intensity to influence 180° domain switching in said increment, the duration of the coincident application of said stress pulse and field intensity being sufficiently short to effectively prevent any substantial amount of 90° switching.

2. The invention as set forth in claim 1 wherein the amplitude of said stress pulse is substantially parallel with the direction of its propagation.

3. The invention as set forth in claim 1 wherein said stress pulse is a uni-polar compressive pulse which when applied coincidently with said field inhibits 180° domain switching in said increment.

4. The invention as set forth in claim 3 wherein said field is at a sufficient intensity so that its application alone is sufficient to cause a significant level of 180° domain switching.

5. The invention as set forth in claim 3 wherein said field is applied within the period of duration of said stress pulse.

6. The invention as set forth in claim 1 wherein said stress pulse is a uni-polar tensile pulse which when applied coincidently with said field enhances 180° domain switching in said increment.

7. The invention as set forth in claim 1 wherein said stress pulse is bi-polar, the compressive portion of which in coincidence with said field inhibits 180° switching, the tensile portion of which in coincidence with said tensile component enhances 180° switching.

8. The invention as defined in claim 1 wherein said ferroelectric material is lead-zirconate titanate.

9. The invention as defined in claim 8 wherein said stress pulse is a uni-polar compressive pulse having an intensity of about 6,300 p.s.i. and a duration of no longer than about 5 microseconds, said field being applied for about 2.5 microseconds and having an intensity of about 40 kv./cm.

References Cited

UNITED STATES PATENTS

| | | | |
|---|---|---|---|
| 3,016,524 | 1/1962 | Edmunds | 340—173 |
| 3,132,257 | 5/1964 | Yando | 333—30 |
| 3,320,596 | 5/1967 | Smith | 340—174 |

TERRELL W. FEARS, *Primary Examiner.*